United States Patent [19]

Calaunan

[11] Patent Number: 5,096,096
[45] Date of Patent: Mar. 17, 1992

[54] FLUIDIZED BED DISCHARGE BIN

[75] Inventor: Marco L. Calaunan, Ft. Worth, Tex.

[73] Assignee: Thomas Conveyor Company, Fort Worth, Tex.

[21] Appl. No.: 552,992

[22] Filed: Jul. 16, 1990

[51] Int. Cl.⁵ .............................................. B67D 5/06
[52] U.S. Cl. .................................. 222/185; 222/195; 406/91; 406/122; 406/138
[58] Field of Search ...................... 222/195, 462, 185; 406/90, 91, 122, 138, 146

[56] References Cited

U.S. PATENT DOCUMENTS

| | | | |
|---|---|---|---|
| 2,665,035 | 1/1954 | Schemm | 406/138 X |
| 3,379,345 | 4/1968 | Gehrung | 406/90 |
| 3,693,839 | 9/1972 | Shaver et al. | 222/195 X |
| 3,933,280 | 1/1976 | Plumb | 406/138 |
| 4,058,239 | 11/1977 | Van Mill | 222/462 |
| 4,439,072 | 3/1984 | Goedken | 406/90 X |
| 4,735,241 | 4/1988 | Spiess | 406/90 X |
| 4,813,818 | 3/1989 | Sanzone | 406/122 |
| 4,846,377 | 7/1989 | Fix et al. | 222/195 |

FOREIGN PATENT DOCUMENTS 284030  1/1928  United Kingdom ............... 406/122

Primary Examiner—Michael S. Huppert
Assistant Examiner—Joseph A. Kaufman
Attorney, Agent, or Firm—Harness, Dickey & Pierce

[57] ABSTRACT

An improved fluidized bed discharge bin comprising a removable closure covering an opening in the bottom of the bin. The closure is of an inverted pyramidal shape having a square base and an offset nadir. A discharge opening is positioned adjacent to the nadir on the side wall toward which the nadir is offset. An air-permeable member overlies the interior of the closure and is retentively secured between the bin opening and the closure. Positioned at the approximate midsection of each wall is a spacer which prevents the air-permeable member from being compressed in complete surface-to-surface contact with the interior surfaces of the closure. Aeration is introduced into the enclosure through an air inlet correspondingly positioned adjacent to the spacer on one wall of the enclosure. The aeration is readily admitted into the space between the air-permeable material and the interior walls of the closure and allowed to permeate into the bin to fluidize the contents contained in the bin and permit their discharge.

1 Claim, 4 Drawing Sheets

FLUIDIZED BED DISCHARGE BIN

BACKGROUND AND SUMMARY OF THE INVENTION

The present invention relates to a fluidized bed discharge bin wherein the bin is aerated to fluidize the contents contained therein and increase the ease with which the contents may be discharged. More particularly, the present invention is a fluidizing closure for covering a hopper opening in the bottom of the bin.

Bulk material such as particulates and powders are often transported in large bins. However, before the materials may be put to use, it is necessary to discharge the materials from the bin. Various techniques and apparatuses are presently used for emptying these bins. One such technique involves the introduction of air into the bin to fluidize the particulates or powdered materials. Once fluidized, the contents readily flow from the bin during discharge.

While fluidization has made the discharging of bins easier, problems remain in that these bins require large discharge openings and that, when closed, the openings are susceptible to leakage. U.S. Pat. No. 4,439,072, issued Mar. 27, 1984, discloses a discharge system incorporating a fluidizing closure that enables the contents of a bin to be discharged through a comparatively small opening that is easily sealed. The present invention is an advancement on the above mentioned patent which is hereby incorporated by reference.

Another problem associated with some of the prior art fluidization bins is "rat holing". Rat holing involves the situation where an air path develops through the particulated material from the source of the aeration up through the bin contents. Once established, the rat hole relieves the pressure of the air and precludes the proper fluidization formation.

One way of fluidizing particulates in a bin and avoiding rat holing is to introduce the aeration to one side of an air-permeable material, such as a fabric sheet, on which the particulates are disposed. The air circulates beneath the fabric and then permeates up through the fabric and fluidizes the particulates in a substantially even manner. Such a device was first disclosed in the '072 patent mentioned previously.

The present invention is directed to an improved spout or closure for fluidizing the contents of a discharge bin. While incorporating all of the advancements of the prior art, including discharge through an easily sealed opening and the avoidance of rat holing, the present invention discloses a construction which employs simplified fabrication techniques, increases storage capacity, improves fluidization, and enhances operator accessibility.

It is therefore an object of the present invention to provide a closure cap having a construction which utilizes simplified fabrication techniques.

It is a further object of the present invention to provide a closure cap which allows the bin to store and handle an increased amount of bulk material without a corresponding increase in the overall size of the bin.

The present invention also has as one of its objects the improvement of air flow during fluidization and therefore an increased discharge rate for the contents of the bin.

Still another object of the invention is to increase operator accessibility to the discharge outlet of the closure.

In summary, the present invention incorporates a square based closure for attachment to an opening in the lower hopper of a storage bin. The sides of the closure converge in a downwardly extending direction so as to form a generally pyramidal shape. The convergence angle of each wall is varied such that the convergence point of all four walls is offset from the central axis of the bin. A discharge outlet is positioned adjacent to the convergence point on the wall having the smallest convergence angle. A sheet of air-permeable material, corresponding in shape to that of the closure and containing apertures aligning with the discharge outlet and the hopper opening, forms a lining on the interior of the closure. A spacer is positioned between the air-permeable material and the interior surfaces of the closure and extends along the midsection of the interior walls of the closure to create and air space therebetween. The closure also includes an air inlet at approximately the same height as the spacer. During operation, air enters through the air inlet, penetrates the air-permeable material and fluidizes the contents of the bin for discharge.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE DRAWINGS

Figure 1:
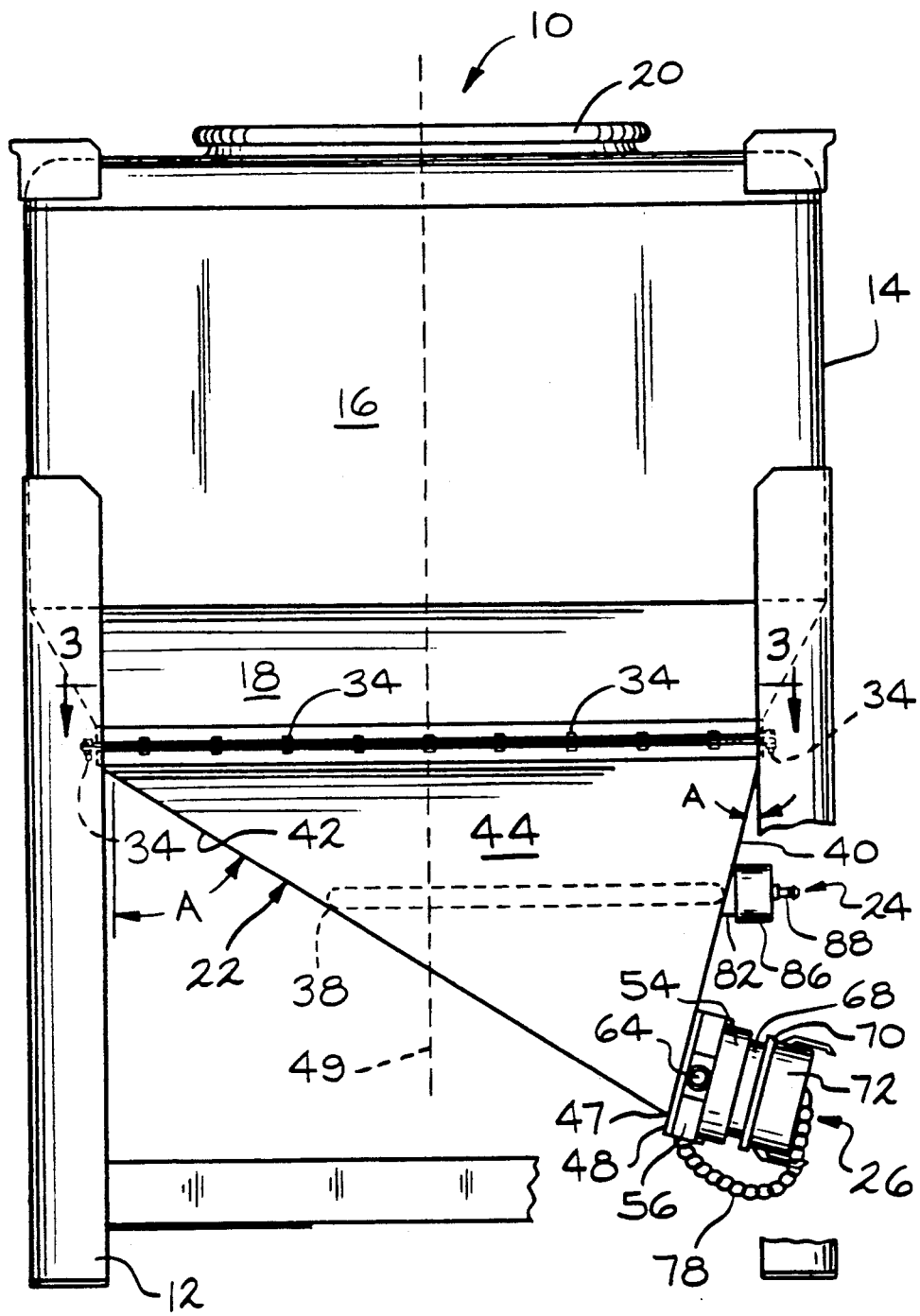
FIG. 1 is a side elevational view of a portion of a fluidized bed discharge bin embodying the principles of the present invention.
Figure 2:
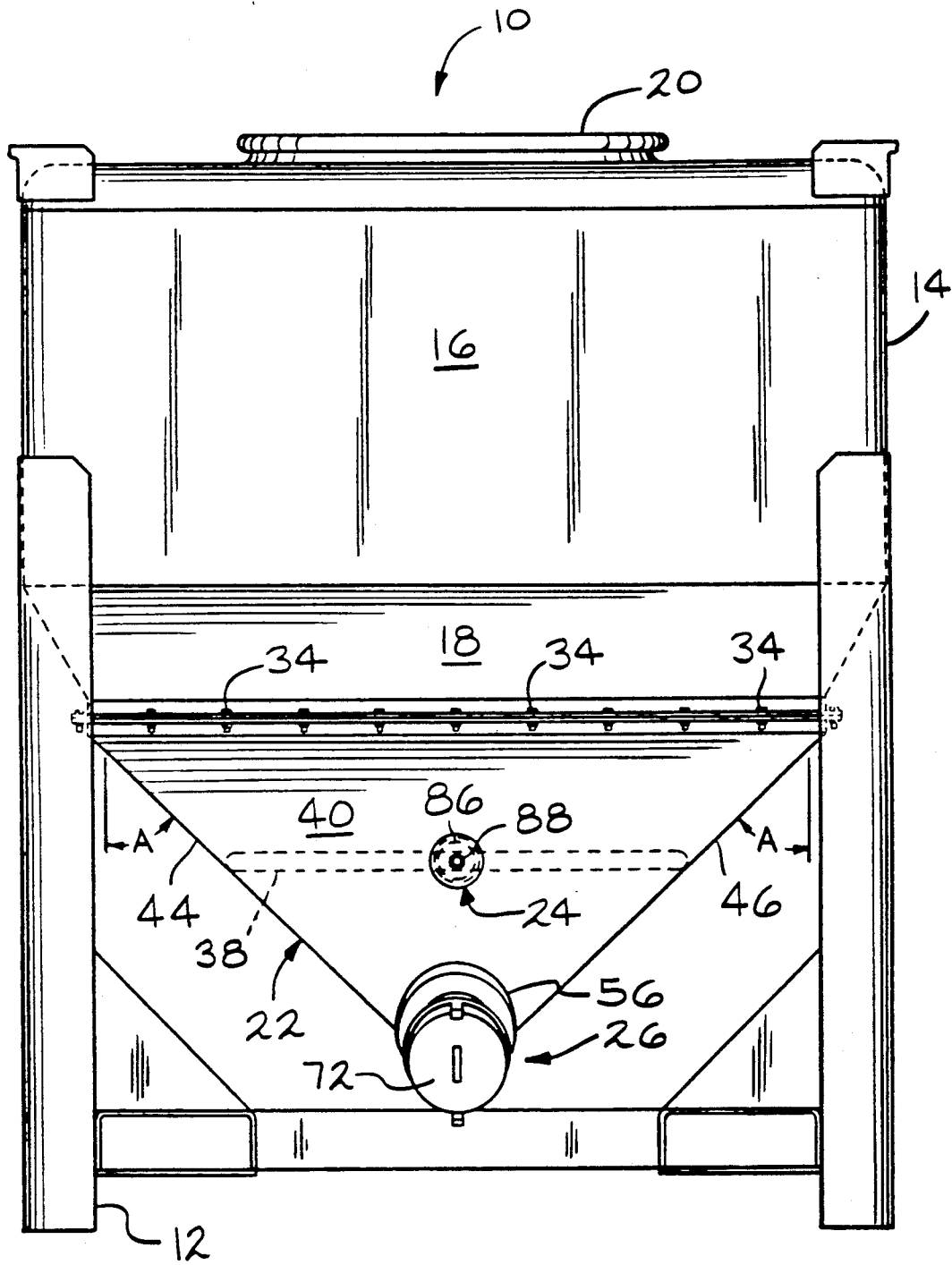
FIG. 2 is a front elevational view of the fluidized bed discharge bin of the present invention.

Now with references to the drawings, FIGS. 1 and 2 illustrate a fluidized bed discharge bin 10 embodying the principles of the present invention. The discharge bin 10 works in conjunction with a pressurized air supply system (not shown) which provides pressurized aeration to the bin 10.

A frame 12 supports the entire bin 10 including a bin chamber 14. The chamber 14 itself includes a main storage portion 16 having a hopper portion 18 formed at the bottom. A cover 20 is removably secured over the fill opening of the chamber 14. The cover lid 20 may be secured in position by a clamping ring or other conventional method. Formed in the bottom of the hopper portion 18 is a hopper opening 19 over which is positioned a fluidizing spout or closure assembly 22.

The closure 22 has two additional apertures, the air opening 80 and the discharge opening 60. An aeration supply source (not shown) is connected to the closure 22 at the air inlet opening 80 and supplies pressurized aeration which fluidizes the contents of the bin 10. Once fluidization has occurred, the bin contents can be discharged from the bin 10 through the discharge opening 60 and a discharge outlet 26. Depending upon particular construction of the bin 10 and the type of bulk material contained therein, it may be beneficial to either continuously supply pressurized air to the contents of the bin 10 or to intermittently supply the pressurized air. In preventing rat hole formation, the intermittent supplying of pressurized air has demonstrated a particular effectiveness.

Figure 3:
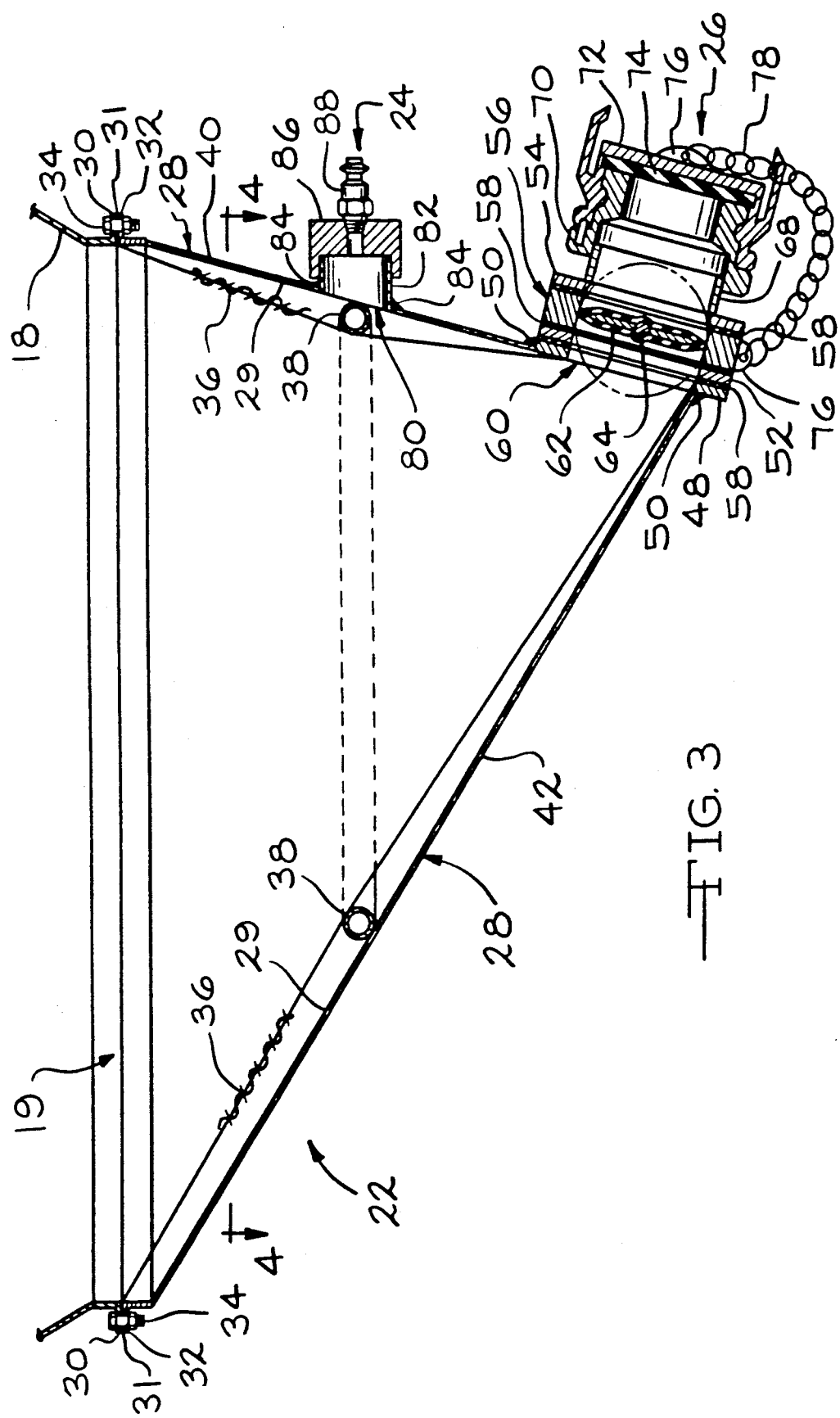
FIG. 3 is an enlarged sectional view taken substantially along line 3—3 in FIG. 1 showing the fluidizing closure of the present invention.
Figure 4:
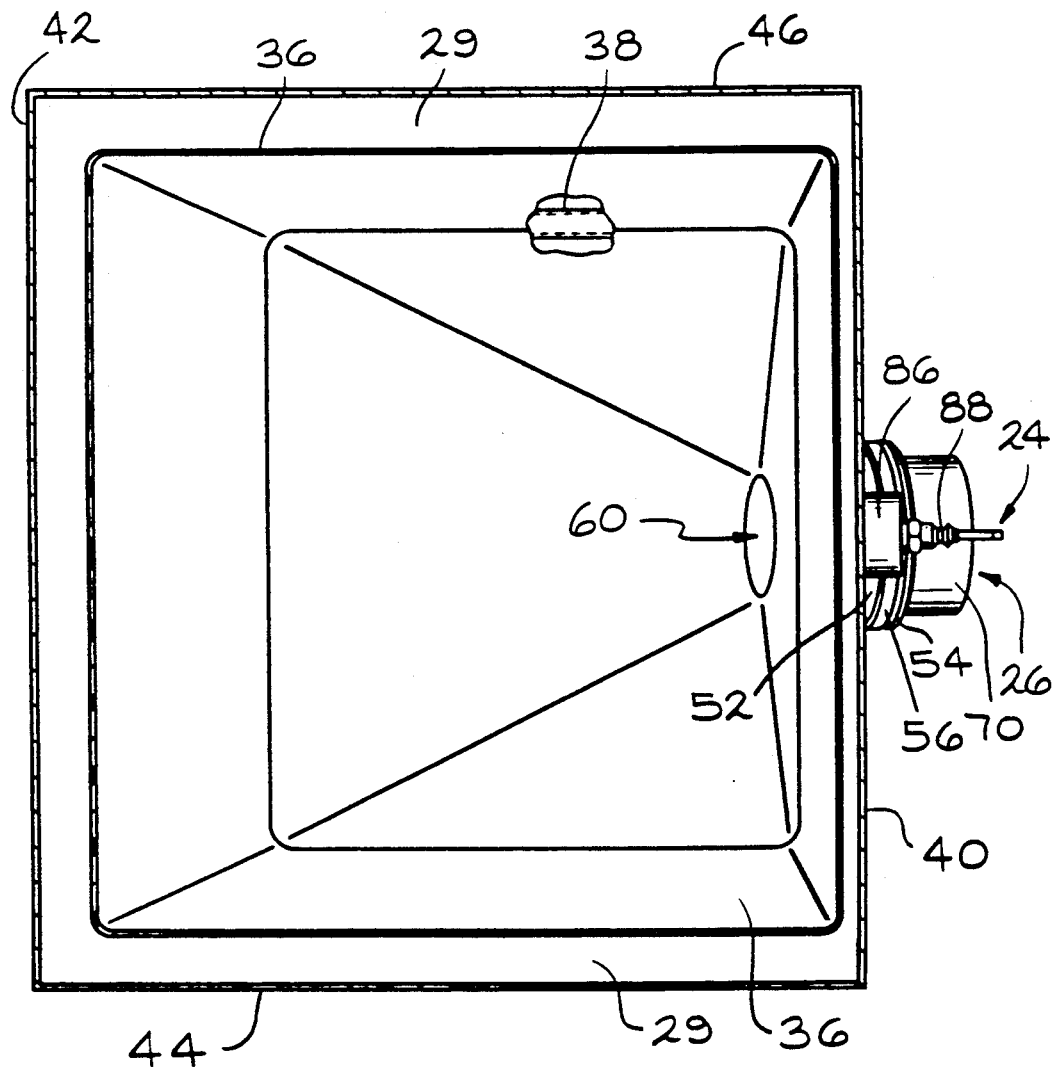
FIG. 4 is a sectional view taken substantially along line 4—4 in FIG. 3 showing the interior of the fluidizing closure of the present invention.

The fluidizing closure 22 of the bin 10 is illustrated in greater detail in FIGS. 3 and 4. The fluidizing closure 22 is a multi-walled enclosure element 28 having four substantially flat walls which are herein designated as a front wall 40, a rear wall 42, a left wall 44 and a right wall 46. The four walls 40, 42, 44 and 46 of the closure 22 originate about the hopper opening 19 which exhibits a rectangular configuration. Both the hopper portion 18 and the four walls 40, 42, 44 and 46 of the closure element 28 have flanges 30 and 32 respectively formed therein. In this manner, the closure element 28 may be secured to the hopper portion 18 by bolt fasteners 34 or other conventional methods. A gasket material 31 may be positioned between the flanges 30 and 32 to ensure an airtight securement between the closure 22 and the hopper portion 18. The airtight seal furthers fluidization in that the aeration is forced through the contents of the bin 10 and as opposed to quickly exiting through a bad seal.

The walls 40, 42, 44 and 46 of the closure element 28 converge in a downward direction and form a generally inverted pyramidal shape. The convergence angle A of each wall 40, 42, 44 and 46, measured from vertical, is altered so as to offset a convergence point or nadir 47 some distance from the central axis 49 of the bin 10. As best seen in FIGS. 1 and 3, in the present embodiment the front wall 40 exhibits the angle of least convergence while the rear wall 42 exhibits the greatest angle of convergence. Thus, the rear wall 42 is substantially longer in length than the front wall 40. The opposing side walls 44 and 46 converge toward the nadir 47 in like fashion. As will be further discussed below, a discharge opening 60 is formed in the front wall 40, adjacent to the nadir 47, of the closure element 28.

A spacer 38 is positioned along the approximate midsection of each wall 40, 42, 44 and 46. While the spacer 38 is illustrated as being tubular shaped and extending along each wall 40, 42, 44 and 46 of the closure element 28 in a substantially horizontal plane, various other configurations are possible so long as the spacer 38 extends some perpendicular distance out from the interior surface 29 each wall 40, 42, 44 and 46.

The closure 22 is lined by a sheet of air-permeable material 36 which generally conforms to the interior surfaces of the closure element 28. At its upper end, the air-permeable material 36 has an aperture which corresponds to the hopper opening 19. Like the closure 22 itself, the air-permeable material 36 is secured between the flanges 30 and 32 by the bolt fasteners 34. A second aperture, at the lower end of the air-permeable material 36, is aligned with the discharge opening 60 and secured therearound by the discharge outlet 26. In the midsection of the closure element 28, the air-permeable material 36 is spaced apart from the interior surface 29 of the closure element 28 by the spacer 38. While numerous materials may be employed as the air-permeable material 36, a two-ply polyester fabric with a 1.98 standard cubic feet per minute per square foot (SCFM/Ft$^2$) permeability has been found to be preferable with the present embodiment.

As previously mentioned, the discharge outlet 26 is formed in the lowermost portion of the front wall 40. Designed and constructed to assist in the full discharge of the bin 10 contents, the discharge outlet 26 is generally constructed with a butterfly valve 56 secured around the discharge opening 60 of the front wall 40 by welding 50 or other securement means. The butterfly valve 56 may include a stacked arrangement of pipe portions 48, 52 and 54 separated by gaskets 58. Received and retentively secured between the pipe portions 48 and 52 is that portion of the air-permeable material 36 aligning with the discharge opening 60.

Opening and closing the butterfly valve 56 is accomplished by rotation of a control stem 64, approximately 90°, causing a blade 62 to likewise rotate and open the discharge outlet 26. A coupling pipe portion 68 is provided with a threaded fitting 70 to which a discharge hose (not shown) or a dust cap 72 and a gasket 74 may be fastened. Flanges 76 and a sash chain 78 permit the dust cap 72 to be retained with the remainder of the discharge opening 26 when the contents of the bin 10 are being discharged.

To efficiently empty the bin 10, the contents are fluidized by the introduction of an aerating media, usually air, through the air inlet 24. A portion of the front wall 40 defines the air opening 80 to which the inlet 24 is secured by welds 84 or other securement means. In the present embodiment, a cap 86 is mounted onto an extension portion 82. The cap 86 is drilled and tapped to receive a nipple 88 which is then connected by a conduit (not shown) to the pressurized air source (also not shown).

While the drawings illustrate the bin 10 being empty, when the bin 10 is filled with a bulk material the weight of the material will compress the air-permeable element 36 against the interior surfaces 29 of the enclosure element 28. The spacer 38, however, prevents the air-permeable element 36 from being compressed entirely flat against these interior surface 29 of the closure element 28. For this reason, the air opening 80 is intentionally positioned adjacent to the spacer 38.

As mentioned previously, the configuration of the present invention allows a greater volume of bulk material to be introduced into the bin 10. The initial separation distance provided by the spacer 38 permits fluidization of the contents to begin at a decreased starting pressure. As air is introduced through the air inlet 24, the amount of the contents being fluidized increases and the air-impermeable element 36 separates some distance from the majority of the interior 29 surfaces of the enclosure element 28. In this manner, the contents are substantially evenly fluidized.

Once fluidization has begun, the dust cap 72 is removed and the control stem 64 of the butterfly valve 56 is rotated approximately 90° causing the blade 62 of the butterfly valve 56 to also rotate. With fluidization already established, the contents readily flow through the discharge outlet 26.

While previous designs used generally annular enclosure elements, the present invention is a generally rectangularly based pyramid. With this construction, the nadir 47 of the enclosure element 28 may be offset toward one side of the bin 10 thereby placing the discharge outlet 26 in a position of increased operator accessibility. Previous designs have tended to incorporate a discharge outlet centrally located below the bin and followed by a conduit containing an elbow curve. The elbow curve transfers the discharging contents to the side of the bin. One disadvantage of the elbow is that, as the discharging contents travel through the elbow, the fluid characteristics of the contents decrease. The subsequent result is a slower discharge rate. This problem is alleviated by the present invention.

The square based construction of the present invention has additional advantages. First, the pyramid construction allows the use of easier fabrication techniques. The simplified fabrication techniques involved with planar surfaces, as opposed to curved surfaces, may now be employed. Another benefit of the present construction is that storage and handling capabilities are increased while the overall size constraints are maintained.

While the pyramid construction allows for a greater amount of product to be introduced into the bin 10, the construction also allows for an increase in the number of square inches of air-permeable material 36 used. Following from this increase in air-permeable material 36, an increased amount of aeration may be introduced into the contents of the bin. The increased fluidization subsequently increases the flow rate at which the bin contents are discharged.

By offsetting the position of the discharge outlet 26, the rate of discharge is further increased by reducing the length of non-aerated conduit through which the material must flow before final discharge. Furthermore, within the present enclosure element 28 fluidization of the discharging material continues up until the point at which the contents enter the discharge opening 60.

While the above description constitutes the preferred embodiments of the present invention, it will be appreciated that the invention is susceptible to modification, variation and change without departing from the proper scope and fair meaning of the accompanying claims.

I claim:

1. A fluidized bed discharge bin having an aerating source means for providing pressurized air to said bin, said discharge bin comprising:

a support frame;

a bin defining a central axis and being supported by said frame, said bin having portions defining a fill aperture and including a cover positioned over said fill aperture, a hopper portion formed on the bottom of said bin and defining a generally rectangular hopper opening;

a removable closure covering said hopper opening and being secured therearound, said covering having four walls with interior surfaces, each of said walls exhibiting angles of convergence and converging downwardly and inward, one of said walls having a least angle of convergence being less than said angles of convergence of the other of said walls, said walls converging so as to contact at a nadir off-set in a direction towards said one wall having said least angle of convergence, said one wall further having a portion defining a discharge opening therein adjacent to said nadir, one of said walls having a portion thereof defining an air inlet connected to said source means;

an air-permeable member disposed in said closure overlying said interior surfaces of said walls, said air-permeable member having a portion defining a first aperture in alignment with said hopper opening and being retentively secured therearound by said closure, said air-permeable member having a portion defining a second aperture in alignment with said discharge opening and being secured therearound;

means for spacing said air-permeable member apart from said interior surfaces of said walls, said spacing means being secured to said interior surfaces of said walls and meeting at corners thereof so as to define a substantially horizontal plane along said walls, said air inlet being defined so as to correspond with said spacing means; and valve means for controlling the discharge of the bin contents, said valve means mounted over said discharge opening and retentively securing said second aperture of said air-permeable member therearound.

* * * * *